(12) United States Patent
    Childress et al.

(10) Patent No.: US 10,224,059 B2
(45) Date of Patent: Mar. 5, 2019

(54) ESCALATION DETECTION USING SENTIMENT ANALYSIS

(71) Applicant: INTERNATIONAL BUSINESS MACHINES CORPORATION, Armonk, NY (US)

(72) Inventors: Rhonda L. Childress, Austin, TX (US); Kim A. Eckert, Austin, TX (US); Ryan D. McNair, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/812,325

(22) Filed: Nov. 14, 2017

(65) Prior Publication Data

US 2018/0068676 A1    Mar. 8, 2018

Related U.S. Application Data

(63) Continuation of application No. 15/216,056, filed on Jul. 21, 2016, now Pat. No. 9,881,636.

(51) Int. Cl.
    *G10L 15/00*      (2013.01)
    *G10L 25/63*      (2013.01)
    (Continued)

(52) U.S. Cl.
    CPC .............. *G10L 25/63* (2013.01); *G06N 5/04* (2013.01); *G10L 15/26* (2013.01); *G10L 25/57* (2013.01)

(58) Field of Classification Search
    USPC ................... 704/231–257, 270–275
    See application file for complete search history.

(56) References Cited

U.S. PATENT DOCUMENTS

| 6,598,020 B1 | 7/2003 | Kleindienst et al. |
| 7,684,984 B2 | 3/2010 | Kemp |

(Continued)

FOREIGN PATENT DOCUMENTS

| GB | 2449425 | 11/2008 |
| WO | 2015025249 | 2/2015 |

OTHER PUBLICATIONS

Fantz et al., "Texas pool party chaos: Police officer resigns—CNN.com", http://www.cnn.com/2015/06/09/us/-mckinney-texas-pool-party-video/, Jun. 9, 2015, 5 pages.

(Continued)

*Primary Examiner* — Jesse S Pullias
(74) *Attorney, Agent, or Firm* — William Hartwell; Andrew D. Wright; Roberts Mlotkowski Safran Cole & Calderon, P.C.

(57) ABSTRACT

Systems an methods of computer-based escalation detection are disclosed. In embodiments, a method includes: determining an occurrence of an interaction event between a first and second party within a recording including audio data; analyzing the audio data; determining an escalation during the interaction event to generate escalation data; partitioning each interaction event into a plurality of sections; assigning a sentiment score for each of the plurality of section; calculating an overall sentiment score for the interaction event, wherein the saved escalation data includes the overall sentiment score; graphing the overall sentiment score for the interaction event with a plurality of additional overall sentiment scores from respective additional interaction events to produce a graph of sentiment scores over time; and detecting a pattern of increasing of decreasing overall sentiment scores over time based on the graph.

17 Claims, 5 Drawing Sheets

(51) Int. Cl.
*G06N 5/04* (2006.01)
*G10L 15/26* (2006.01)
*G10L 25/57* (2013.01)

(56) References Cited

U.S. PATENT DOCUMENTS

| | | | |
|---|---|---|---|
| 9,881,636 B1* | 1/2018 | Childress | G10L 25/63 |
| 2002/0194002 A1 | 12/2002 | Petrushin | |
| 2005/0114142 A1 | 5/2005 | Asukai et al. | |
| 2006/0190419 A1 | 8/2006 | Bunn et al. | |
| 2013/0132088 A1 | 5/2013 | Kim | |
| 2014/0163960 A1 | 6/2014 | Dimitriadis et al. | |

OTHER PUBLICATIONS

Williams, "Long Taught to Use Force, Police Warily Learn to De-escalate", The New York Times, http://www.nytimes.com/2015/06/28/us/long-taught-to-use-force-police-warily-learn-to-de-escalate.html?_r=0, Jun. 27, 2015, 5 pages.

Graham et al., "Boston Officials Track, Analyze Tweets for 'Sentiment Analysis'", http://www.govtech.com/social/Boston-Officials-Track-Analyze-Tweets-for-Sentiment-Analysis.html, May 18, 2015, 4 pages.

Rudin et al., "Predictive Policing: Using Machine Learning to Detect Patterns of Crime", http://www.wired.com/insights/2013/08/predictive-policing-using-machine-learning-to-detect-patterns-of-crime/, Accessed Mar. 1, 2016, 7 pages.

"Researchers Use Machine Learning to Boil Down the Stories that Wearable Cameras Are Telling", UT News, The University of Texas at Austin, http://news.utexas.edu/2013/09/12/machine-learning-wearable-cameras-stories, Sep. 12, 2013, 3 pages.

Pearl et al., ""C'mon—You Should Read This":Automatic Identification of Tone from Language Text", http://www.socsci.uci.edu/~lpearl/papers/PearlSteyvers2013_MentalStatesLangText.pdf, International Journal of Computational Linguistics (IJCL), vol. (4), Issue (1), 2013, 19 pages.

Akkiraju, "IBM Watson Tone Analyzer—new service now available", https://developer.ibm.com/watson/blog/2015/07/16/ibm-watson-tone-analyzer-service-experimental-release-announcement/, Jul. 16, 2015, 20 pages.

Goud, "How long a Surveillance Video should be stored?", http://blog.dnfcorp.com/?p=2078, May 6, 2013, 2 pages.

Specification "Escalation Detection Using Sentiment Analysis " and Drawings in U.S. Appl. No. 15/216,056, filed Jul. 21, 2016, 35 pages.

List of IBM Patents or Patent Applications Treated as Related, dated Dec. 5, 2018, 1 page.

Specification "Computer-Based Escalation Detection" and Drawings in U.S. Appl. No. 16/202,155, filed Nov. 28, 2018, 35 pages.

* cited by examiner

ESCALATION DETECTION USING SENTIMENT ANALYSIS

BACKGROUND

The present invention relates generally to computer-based escalation detection and, more particularly, to methods and systems for escalation detection and analysis.

Training and evaluation of public or client-facing personnel is of concern to businesses and government agencies alike. In particular, there is a desire to properly train and evaluate personnel with respect to the escalation of an interaction between personnel and the public and/or clients. Many conflicts arise when the escalation of an interaction leads to hostile behavior in situations that started out in a seemingly unthreatening manner. An escalation of the situation, either intentional or unintentional, may lead to increased tension from participants. For this reason, de-escalation is being considered as a technique for better policing and as a way to improve the relationship between client facing personnel and the people with whom they interact.

The use of video cameras to capture video footage of public/private interactions is increasingly utilized by businesses and government organizations. For example, it is increasingly common for retail stores, public safety departments, etc., to employ cameras, which allows for review of video footage of an interaction event after it occurs. With the vast quantity of video footage that can be generated, it is highly burdensome for a human to review the footage to determine personnel performance. However, there is a need to utilize the video footage to monitor personnel activity and provide feedback on which personnel are successfully interfacing with the public/clients and which personnel could use additional training, such as de-escalation training. There is a further need to leverage the video footage in the training of personnel to better interact with the public and/or clients.

SUMMARY

In an aspect of the invention, a computer-implemented method includes: determining, by a computer device, the occurrence of an interaction event between a first party and a second party within a recording including audio data; analyzing, by the computer device, the audio data for a change in tone over time; analyzing, by the computer device, the audio data for the presence of any negative tones; determining, by the computer device, whether the change in tone, the presence of any negative tones, or a combination of the change in tone and the presence of any negative tones, indicates an escalation during the interaction event to generate escalation data; and saving, by the computer device, the escalation data.

In another aspect of the invention, there is a computer program product for detecting escalation. The computer program product includes a computer readable storage medium having program instructions embodied therewith. The program instructions are executable by a computing device to cause the computing device to: determine the occurrence of an interaction event between a first party and a second party within an audio-video recording including audio data; analyze the audio data for a change in tone over time; analyze the audio data for the presence of any negative tones; determine whether the change in tone, the presence of any negative tones, or a combination of the change in tone and the presence of any negative tones, indicates an escalation during the interaction event to generate escalation data; save the escalation data; and compare the saved escalation data to historic escalation data.

In another aspect of the invention, there is a system for detecting escalation. The system includes a CPU, a computer readable memory and a computer readable storage medium associated with a computing device; program instructions to determine the occurrence of a first interaction event between a first person of interest and one or more members of the public within an audio-video recording including audio data and video data; program instructions to analyze the audio data for a change in tone over time; program instructions to analyze the audio data for the presence of any negative tones; program instructions to determine whether the change in tone, the presence of any negative tones, or a combination of the change in tone and the presence of any negative tones, indicates an escalation during the first interaction event to generate escalation data; and program instructions to save the escalation data. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
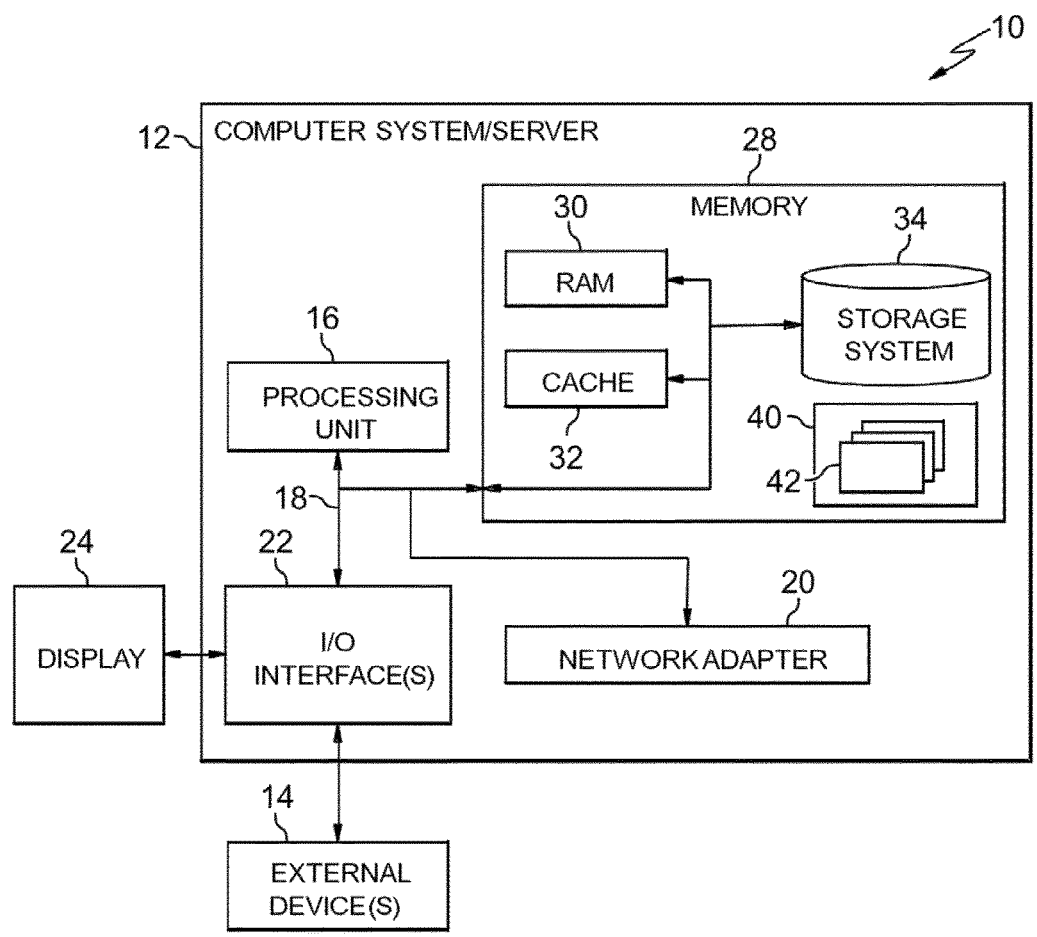
FIG. 1 depicts a computing infrastructure according to an embodiment of the present invention.

The present invention relates generally to computer-based escalation detection. Implementations of the present invention can be used in the training of public or client-facing personnel. In embodiments, large amounts of personnel training data in the form of audio-video recordings can be analyzed for escalation information. For example, vast quantities of video footage that has been saved as a precautionary measure, in case an incident of concern occurred during the recording of the footage, may be analyzed. In accordance with aspects of the present invention, some or all of this saved footage may be classified as escalating or de-escalating so that it can be used in a training algorithm. It should be understood that the term escalation or escalating is intended to mean an increase in the intensity or seriousness of a situation, where the increase is negative (i.e., makes a situation worse or more severe). Conversely, the term de-escalation is intended to mean a decrease in the intensity or seriousness of a situation, and can also be understood as a calming of intensity.

In embodiments, video footage of a personnel/public interaction can be labeled as "escalating". The term personnel as used herein is intended to mean a person of interest for whom a company or agency is interested in evaluating for escalation/de-escalation behaviors. For the purpose of this invention, the term "public" is intended to encompass non-personnel, such as clients and private citizens. In embodiments, video footage of a person of interest with a history of negative interactions with the public may be labeled as "escalating". Likewise, video footage of a person of interest with a history of positive or de-escalating interactions with the public may be labeled as "de-escalating". Optionally, labeling of video footage as "escalating" or "de-escalating" can be crowd-sourced, such as with a game.

Data-points constituting an interaction between a person of interest (personnel) and the public can be identified within the classified video data. In embodiments, a long gap in audio associated with the video footage can indicate that personnel are likely between public interaction events. Conversely, personnel entering the frame of video footage may indicate that a public interaction event is occurring.

In embodiments, a sentiment-analysis program is used to track how a tone progresses through the course of an interaction between a person of interest and the public. In the context of the present invention, tone is intended to mean an indication of a mental state of a person or persons. By way of example, a tone can indicate an emotion, such as joy, cheerfulness, anger, fear, sadness and disgust. Tone analysis may also be referred to herein as sentiment analysis. In aspects, an audio file associated with a video file of interest can be transcribed into text, and thereafter analyzed using tone analysis. Different tone analysis methods (semantic or linguistic analysis), are commercially available, and the specific means by which tone is analyzed is not the focus of the present invention. In general, linguistic analysis can be used to detect and interpret emotional, social and language cues found in text. One example is the IBM Watson™ tone analyzer, which uses linguistic analysis to detect three types of tones from written text: emotions, social tendencies, and writing style. IBM and Watson are both trademarks of International Business Machines Corporation. Emotions identified include anger, fear, joy, sadness and disgust.

In aspects, direct tone analysis of the audio file associated with a video file of interest may be conducted. By analyzing how tone changes from a beginning to an end of a conversation, as well as the combination of tones being used, an idea of which participants are escalating the situation can be obtained. Analyzing these trends of "change in tone" and "frequency of negative tones" of different personnel over time can be used to determine which personnel are performing at an acceptable level and which personnel would benefit from additional assistance and/or additional training with respect to public interactions.

In aspects, tone or sentiment analysis provides a classification of sentiment, such as "positive", "very positive", "neutral", "negative", very negative", etc. Such classification may be converted into numeric values. For example, negative values may represent negative sentiment and more positive values may represent more positive sentiment. With these numeric values, a score can be associated with an interaction between a person of interest and the public. Scoring can be accomplished by first partitioning each interaction into "n" sections, where a first section represents the start of the interaction, and the "nth" section represents the end of the interaction. Next, sentiment analysis can be run on each section to obtain a "sentiment score" for each section. Thereafter, an overall "sentiment score" may be created by combining the sum of the sections (to determine overall sentiment of the conversation) and the sum of the change in sentiment between each section (to determine how the sentiment changes throughout the conversation). Weights for combining data may be determined in a learning phase using supervised/semi-supervised learning techniques. By monitoring personnel's sentiment score over time, a business/government entity can determine when individuals engage the public in a negative manner.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
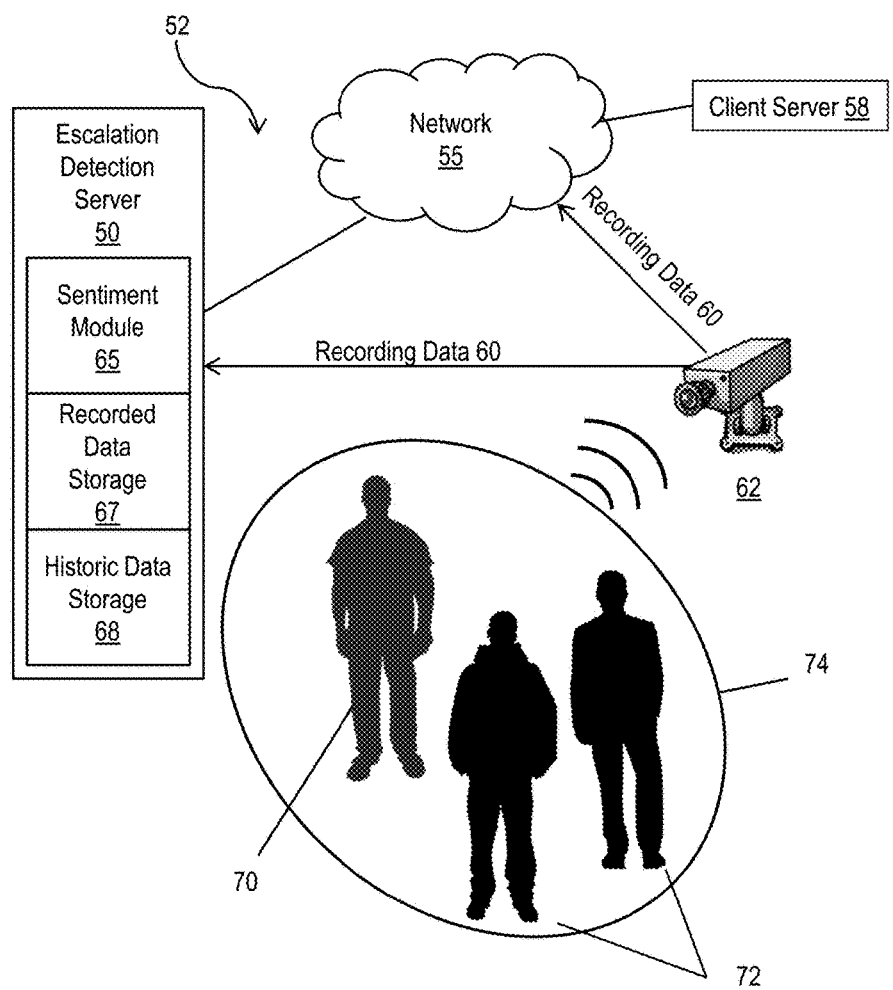
FIG. 2 shows an exemplary environment in accordance with aspects of the invention.

FIG. 2 shows an exemplary environment in accordance with aspects of the invention. The environment includes an escalation detection server 50 (e.g., a web server), which may comprise a computer system 12 of FIG. 1, and may be connected to a network 55 via the network adapter 20 of FIG. 1. The server 50 may also be in communication with a client server 58 via network 55. The server 50 may be configured as a special purpose computing device that is part of an escalation detection system 52. The server 50 may be configured to receive recording data 60 (e.g., video recording data including image data and audio data) from a recording device 62 (e.g., an audio-video recorder or audio recorder), either directly or indirectly through network 55. The network 55 may be any suitable communication network or combination of networks, such as a local area network (LAN), a general wide area network (WAN), and/or a public network (e.g., the Internet). The recording data 60 may be in any form (e.g., streaming or saved digital data).

Still referring to FIG. 2, a sentiment module 65 of the server 50 is configured to perform one or more of the functions described herein. The sentiment module 65 may include one or more program modules (e.g., program module 42 of FIG. 1) executed by the server 50. Sentiment module 65 may include an automated natural language computer processor for text analysis. Sentiment module 65 may utilize computational linguistics to identify and extract subjective information from source material. Sentiment module 65 may utilize a database of words and phrases to determine a tone of an interaction, wherein each word or phrase in the database is associated with a characteristic (e.g., typical tone or emotion association with a word or phrase). Sentiment module 65 may enable a user to update the database to include new words and phrases and their characteristics (e.g., a user may enter a phrase that has the characteristic of indicating "happiness"). In embodiments, the sentiment module 65 is configured to analyze the recording data 60 for tone type (e.g., negative or positive tones) and change in tone over time, in order gather escalation data (e.g., whether a conversation escalates over time). In aspects, the server 50 includes recorded data storage 67, for storing the recording data 60. In aspects, the server 50 includes historic data storage 68, for storing outputs from sentiment module 65, including escalation data.

In aspects of the invention, the recording data 60 includes audio or audio/visual data encompassing an interaction event (represented by 74 in FIG. 2) between a first party 70 comprised of one or more individuals of interest, and a second party 72 comprised of one or more members of the public. An interaction event can be any type of interaction including verbal communication between one or more persons of interest and one or more members of the public. By way of example, the first party 70 can be a public-facing employee, such as a customer service representative and the second party 72 can be a customer in need of assistance who is speaking with the customer service representative over a telephone line. As another example, the first party 70 can be a public safety officer and the second party 72 can be a group of citizens speaking with the public safety officer.

Figure 3:
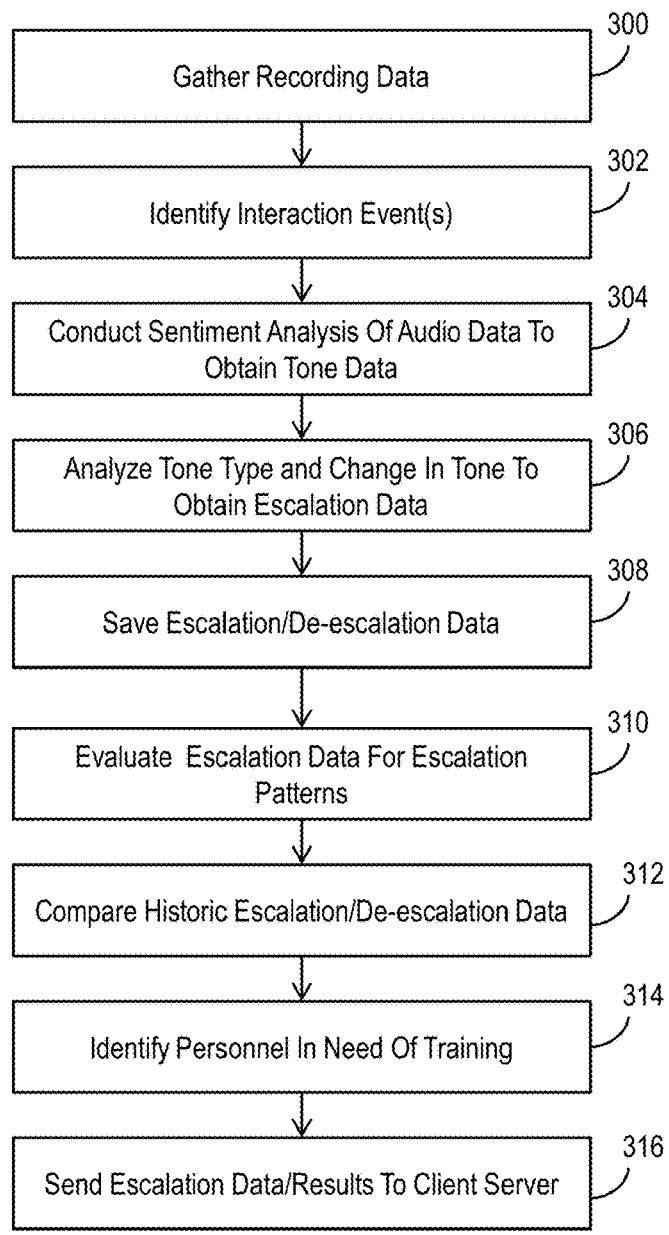
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2. At step 300 recording data 60 from a recording device 62 is gathered by server 50. The recording data 60 can be in the form of streaming data or saved data. The recording data 60 may be combined audio-video or audio data. In aspects, the recording data 60 is in the form of audio-video data recorded by a public safety officer's body camera. It should be understood that the recording data 60 may contain data that is not relevant to the escalation detection system 52 of the present invention. For example, audio-video data recorded by a public safety officer's body camera while they are driving between events may not contain any interaction events 74 between the officer and a member of the public.

Accordingly, at step 302, sentiment module 65 identifies one or more interaction events 74 within the recording data 60. An interaction event 74 may be identified in a number of ways. In aspects, the sentiment module 65 will automatically detect a beginning and an ending of an interaction event 74 based on whether audio data of recording data 60 meets a predetermined threshold value (e.g., the sound level of the audio data exceeds a predetermined value). In aspects of the invention, the beginning and end of an interaction event 74 will be automatically determined by the sentiment module 65 based on the presence of one or more participants within a video frame (i.e., one or more participants are visually recorded) for a predetermined amount of time (t). In aspects of the invention, manual detection of an interaction event 74 alone, or in combination with automated techniques using the sentiment module 65, are utilized to identify a beginning and an end of an interaction event 74.

At step 304, the sentiment module 65 conducts a sentiment analysis of audio data associated with an interaction event 74 identified at step 302, in order to obtain tone data. In embodiments, the sentiment module 65 analyzes audio data for tone type and for change in tone over time. Tone type can be a positive tone or a negative tone. For example, negative tone types that may be identified include tone types that indicate that a person is scared, angry, or worried. In embodiments, audio data is first converted into text data, and then the sentiment module 65 analyzes the text data for tone type and for change in tone over time. In aspects, the text data as a whole is analyzed, and no distinction is made between the words spoken by one or more persons of interest (e.g., first party 70) and the words spoken by one or more of the public (e.g., second party 72). The sentiment module 65 may use a commercially available sentiment-analysis program to detect change in tone over time and type of tone.

At step 306, the tone data gathered at step 304 is analyzed by sentiment module 65 to detect escalation or de-escalation patterns in order to obtain escalation data. By way of example, the amount of a particular type of tone (e.g., positive or negative) in each section of an interaction event may be analyzed by sentiment module 65 to determine if the amount of the particular type of tone is increasing or decreasing from one section to the next. By way of example, if positive words or phrases increase over time in an interaction event, sentiment module 65 may determine that a de-escalation pattern has occurred. In aspects, analyses of change in tone over time from a beginning to an end of a conversation, as well as the combination of tones being used, can indicate an escalating or de-escalating situation.

At step 308, the escalation data gathered at step 306 is saved to historic data storage 68. Optionally, at step 310, the escalation data from a plurality of interaction events involving the same person of interest (e.g., a public safety officer) can be compiled and analyzed to determine any patterns in escalation behavior across different interaction events. In aspects of the invention, a sentiment score is assigned to each interaction event based on the escalation data associated therewith, and the sentiment score is monitored over time to determine if the sentiment score indicates a pattern. For example, a sentiment score that is continuously low may indicate a tendency for a client-facing employee to be involved in escalating events (e.g., communications with a member of the public that become more negative, hostile, and/or tense over time). Such employees may then receive special training involving de-escalation techniques.

Optionally, at step 312, escalation data saved at step 308 may be compared to historic escalation data. For example, saved escalation data may be compared to historic escalation data from a plurality of persons of interest to determine how the persons of interest compare to one another. By way of example, customer service employees of a business may be compared to one another, and may be ranked based on escalation data.

At step 314, data gathered during either of steps 310 and 312 may be utilized to identify persons of interest (personnel) in need of training. Further, recording data 60 determined to include "escalation" may be utilized as an example of a first type of public interaction behavior, while recording data 60 determined to include positive escalation scores or "de-escalation" may be utilized as an example of a second type of public interaction behavior. In embodiments, escalation detection server 50 is a service provider who provides escalation analytics to clients (e.g., client server 58).

At optional step 316, escalation detection server 50 sends escalation data and data analytics results to at least one client server 58 via network 55. In examples, client server 58 is an employer or government agency who supplies recording data 60 to escalation detection server 50 for analysis.

Training algorithms may be utilized to identify persons of interest and to identify baseline metrics for utilization during steps 310 and 312. For example, certain baseline sentiment scores may be standard for a particular type of interaction event, such as an interaction event involving a customer service representative assigned to communicate with customers that have been previously mishandled by a business. In such cases, it can be understood that the average starting sentiment score for all interaction events may be negative (e.g., a sentiment score of −2 shown in FIG. 4B). In embodiments, escalation data may be scaled or weighted against historic escalation data to adjust various parameters (such as an average negative starting sentiment score) as part of evaluation step 310, or as part of step 312. Thus, it should be understood that in aspects of the invention, data analysis can be refined and customized for a particular group based on baseline escalation data and sentiment score values.

In aspects of the invention, escalation data from one group of participants can be compared to a second group of participants at step 312. By way of example, escalation data from client facing personnel in a first service area may be compared to escalation data from client facing personnel in a second service area to identify any differences in average sentiments scores with respect to the first and second service areas. In aspects of the invention, sentiment module 65 is configured to combine sentiment scores for each of the plurality of sections "n" in an interaction event to determine an overall sentiment score for the interaction event. For example, an interaction event can be divided into "n" sections with each section representing a five minute recording interval. By way of another example, "n" sections can each represent a predetermined number of characters in a text file (where audio data associated with the interaction event is first converted into text data). Overall sentiment scores for a plurality of interaction events involving a person of interest can be obtained and any changes in the overall sentiment scores over time can be monitored to determine any increase or decrease in escalation. Such an increase or decrease may indicate that the person of interest is responding well to training (i.e., overall sentiment scores are going up to indicate less escalation and/or more de-escalation), or is in need of training (i.e., overall sentiment scores are going down to indicate more escalation and/or less de-escalation). In aspects, persons of interest having sentiment scores or overall sentiment scores ranking within the bottom X % of a group can be selected for de-escalation training or other remedial action(s). In embodiments, an analysis is conducted of overall sentiment scores for a plurality of persons of interest, and those individuals with a ranking within the bottom 5% are slated for remedial action(s).

Figure 4A:
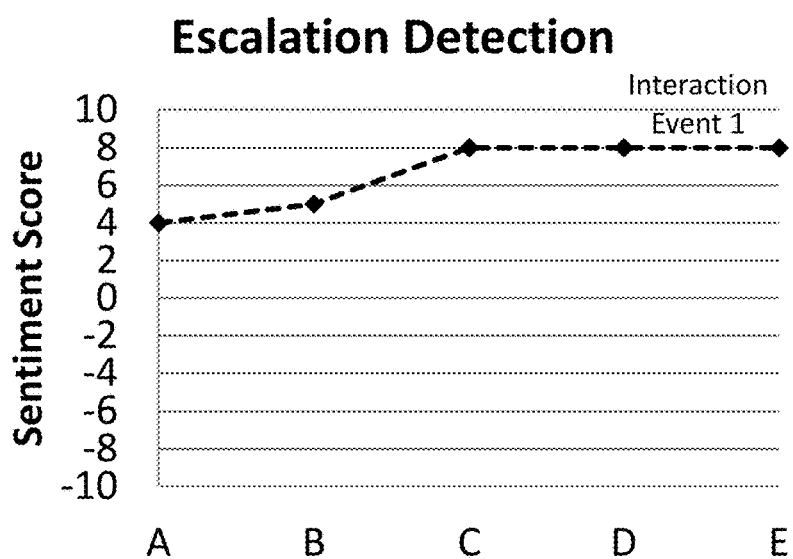
FIGS. 4A and 4B show exemplary escalation detection graphs in accordance with aspects of the invention.
Figure 4B:
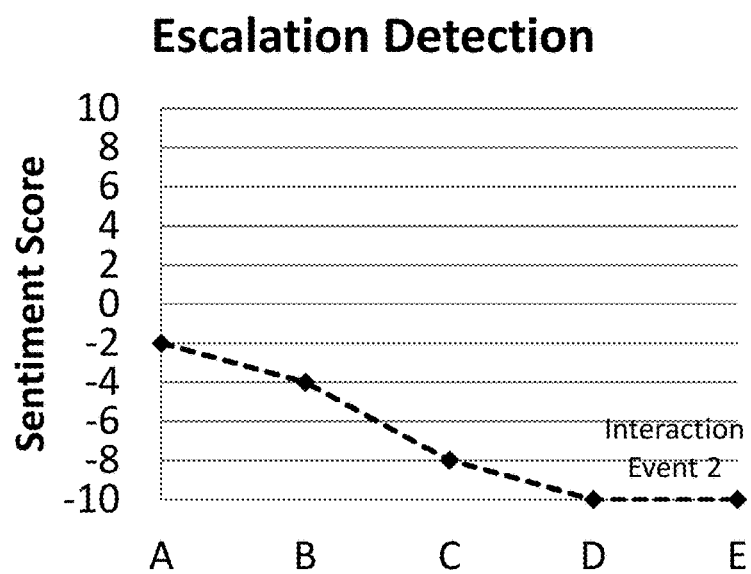

In embodiments, the escalation data can be graphed, and the graph analyzed to determine if escalation is increasing or decreasing during over the course of one or more interaction events. FIGS. 4A and 4B depict escalation detection graphs for respective first and second interaction events generated in accordance with embodiments of the invention. In aspects, step 302 of FIG. 3 includes the step of partitioning an interaction event 74 into "n" sections, wherein the first section represents a start of an interaction between a person(s) of interest and a member(s) of the public, and the "n"th section represents an end of the interaction. As noted previously, in embodiments, "n" sections may be based on a predetermined time period (e.g., 5 minutes) or a predetermined number of text characters (e.g., 25 words). In aspects of the invention, step 302 is performed by sentiment module 65 of escalation detection server 50. However, partitioning of an interaction event can also be done manually. In the examples of FIGS. 4A and 4B, first and second interaction events are broken into five sections A-E. A sentiment analysis (step 304) is conducted by the sentiment module 65 for each section (e.g., A-E), and each section is assigned a sentiment score. In the examples shown in FIGS. 4A and 4B, sentiment scores are assigned a rating between 10 and −10, wherein 10 is the most positive, 0 is neutral, and −10 is the most negative. The sentiment scores may be utilized to determine patterns over time (step 310 of FIG. 3), and may be compared with the scores of other persons of interest (step 312 of FIG. 3).

FIG. 4A shows a graph of sentiment scores for sections A-E of a first interaction event. An interaction event is shown, for example, having an overall positive sentiment score pattern for an interaction event. That is, the graph of FIG. 4A shows a positive increase in sentiment score over time (i.e., de-escalation). In contrast, FIG. 4B shows a graph of scores for sections A-E of a second interaction event, wherein an interaction event 2 is shown having an overall negative sentiment score pattern for the second interaction event. That is, the graph of FIG. 4B shows a decrease in sentiment score over time (i.e., escalation). In aspects of the invention, personnel may be ranked based on overall sentiment change over time for particular interaction events in which they are involved. For example, the overall sentiment change of a first person of interest involved in interaction event 1 would be positive, while the overall sentiment change of a second person of interest involved in interaction event 2 would be negative, resulting in the first person of interest being ranked higher than the second person of interest. It should be understood that ratings can be generated based on escalation data from a plurality of interaction events. Ranking data could be used to determine which person(s) of interest require some type of intervention activity, such as de-escalation training.

Figure 5:
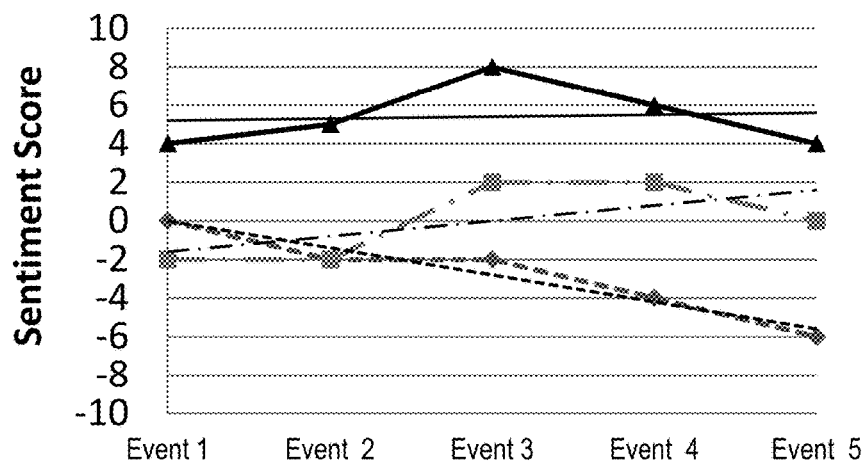
FIG. 5 shows an exemplary overall sentiment score comparison graph in accordance with aspects of the invention.

FIG. 5 depicts an escalation detection graph of overall sentiment scores for five different interaction events. More specifically, FIG. 5 depicts changes in overall sentiment scores over time, including five interaction events. Trendlines are shown for each of three persons of interest associated with the interaction event data. FIG. 5 provides one example of sentiment score utilization to determine trends and to compare persons of interest.

In embodiments, a service provider, such as a Solution Integrator, could offer to perform the processes described herein. In this case, the service provider can create, maintain, deploy, support, etc., the computer infrastructure (e.g., escalation detection server 50) that performs the process steps of the invention for one or more customers (e.g., client server 58). These customers may be, for example, any business or government agency that uses recording technology. In return, the service provider can receive payment from the customer(s) under a subscription and/or fee agreement and/or the service provider can receive payment from the sale of advertising content to one or more third parties.

In still another embodiment, the invention provides a computer-implemented method for determining an escalation during an interaction event to generate escalation data. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    determining, by a computer device, an occurrence of an interaction event between a first party and a second party within a recording including audio data;
    analyzing, by the computer device, the audio data;
    determining, by the computer device and based on the analyzing the audio data, an escalation during the interaction event to generate escalation data;
    saving, by the computer device, the escalation data
    partitioning, by the computer device, each interaction event into a plurality of sections, wherein a first section represents a start of the interaction event, and another section represents an end of the interaction event;
    assigning, by the computer device, a sentiment score for each of the plurality of sections;
    calculating, by the computer device, an overall sentiment score for the interaction event by combining the sentiment scores for each of the plurality of sections, wherein the saved escalation data includes the overall sentiment score;
    graphing, by the computer device, the overall sentiment score for the interaction event with a plurality of additional overall sentiment scores from respective additional interaction events to produce a graph of sentiment scores over time; and
    detecting, by the computer device, a pattern of increasing or decreasing overall sentiment scores over time based on the graph.

2. The computer-implemented method of claim 1, wherein determining the occurrence of an interaction event includes detecting, by the computing device, a threshold level of sound in the audio data.

3. The computer-implemented method of claim 1, further comprising comparing, by the computing device, the escalation data to historic escalation data.

4. The computer-implemented method of claim 1, further comprising:
    gathering, by the computing device, overall sentiment scores for a plurality of interaction events involving the first party; and
    monitoring, by the computing device, the overall sentiment scores over time to determine any increase or decrease in the overall sentiment scores.

5. The computer-implemented method of claim 1, further comprising:
    converting, by the computing device, the audio data into text,
    wherein the analyzing the audio data comprises analyzing the text for a change in tone over time.

6. The computer-implemented method of claim 5, wherein the audio data as a whole is converted to text and analyzed without distinguishing between audio data generated by the first party and audio data generated by the second party.

7. A computer program product for detecting escalation the computer program product comprising a computer readable storage medium having program instructions embodied therewith, the program instructions executable by a computing device to cause the computing device to:
- determine an occurrence of an interaction event between a first party and a second party within an audio-video recording including audio data;
- analyze the audio data for a change in tone over time;
- analyze the audio data for a presence of any negative tones;
- determine whether the change in tone, the presence of any negative tones, or a combination of the change in tone and the presence of any negative tones, indicates an escalation during the interaction event to generate escalation data;
- save the escalation data;
- compare the saved escalation data to historic escalation data;
- gather overall sentiment scores for a plurality of interaction events involving the first party;
- monitor the overall sentiment score over time to determine any increase or decrease in the overall sentiment scores; and
- graph the overall sentiment scores, wherein the monitoring comprises detecting a pattern of increasing overall sentiment scores over time based on the graph.

8. The computer program product of claim 7, wherein the program instructions to determine the occurrence of an interaction event include instructions to detect a threshold level of sound in the audio data.

9. The computer program product of claim 7, wherein the recording is a video recording and the program instructions to determine the occurrence of an interaction event include instructions to detect that the first party or the second party has entered a frame of the video recording for a predetermined time period.

10. The computer program product of claim 7, the program instructions further causing the computing device to:
- partition each interaction event into a plurality of sections, wherein a first section represents a start of the interaction event, and another section represents an end of the interaction event;
- assign a sentiment score for each of the plurality of sections based on the changes in the tone over time and the presence of any negative tones; and
- calculate an overall sentiment score for the interaction event by combining the sentiment scores for each of the plurality of sections, wherein the saved escalation data includes the overall sentiment score.

11. The computer program product of claim 7, the program instructions further causing the computing device to convert the audio data into text, wherein the instructions to analyze the audio data for a change in tone over time and the instructions to analyze the audio data for the presence of any negative tones comprises analyzing the text.

12. The computer program product of claim 11, wherein the audio data as a whole is converted to text and analyzed without distinguishing between audio data generated by the first party and audio data generated by the second party.

13. A system for detecting escalation, comprising:
- a CPU, a computer readable memory and a computer readable storage medium associated with a computing device;
- program instructions to determine an occurrence of a first interaction event between a first person of interest and one or more members of the public within an audio-video recording including audio data and video data;
- program instructions to analyze the audio data for a change in tone over time;
- program instructions to analyze the audio data for a presence of any negative tones;
- program instructions to determine whether the change in tone, the presence of any negative tones, or a combination of the change in tone and the presence of any negative tones, indicates an escalation during the first interaction event to generate escalation data;
- program instructions to save the escalation data;
- program instructions to gather overall sentiment scores for a plurality of interaction events involving the first party;
- program instructions to monitor the overall sentiment scores over time to determine any increase or decrease in the overall sentiment scores;
- program instructions to partition each interaction event into a plurality of sections, wherein a first section represents a start of the first interaction event, and another section represents an end of the first interaction event;
- program instructions to assign a sentiment score for each of the plurality of sections based on the changes in the tone over time and the presence of any negative tones;
- program instructions to calculate an overall sentiment score for the first interaction event by combining the sentiment scores for each of the plurality of sections, wherein the saved escalation data includes the overall sentiment score;
- program instructions to compare the overall sentiment score with an overall sentiment score of a second interaction event involving a second person of interest; and
- program instructions to rate the first and second persons of interest based on the comparing the overall sentiment scores,
wherein the program instructions are stored on the computer readable storage medium for execution by the CPU via the computer readable memory.

14. The system of claim 13, further comprising:
- program instructions to graph the overall sentiment scores, wherein the monitoring comprises detecting a pattern of increasing overall sentiment scores over time based on the graph; and
- program instructions to send data analytics results to a client server, wherein the data analytics results indicate that the overall sentiment scores are increased over time.

15. The system of claim 13, further comprising program instructions to compare the escalation data to historic escalation data.

16. The system of claim 13, further comprising program instructions to convert the audio data into text, wherein the program instructions to analyze the audio data for a change in tone over time and the program instructions to analyze the audio data for the presence of any negative tones comprises program instructions to analyze the text.

17. The system of claim 16, wherein the audio data as a whole is converted to text and analyzed without distinguishing between audio data generated by the first party and audio data generated by the second party.

* * * * *